UNITED STATES PATENT OFFICE.

MICHAEL O. SULLIVAN, OF THOMPSON STATION, ILLINOIS.

IMPROVED METHOD OF DESTROYING LICE ON TREES.

Specification forming part of Letters Patent No. 56,633, dated July 24, 1866.

*To all whom it may concern:*

Be it known that I, MICHAEL O. SULLIVAN, of Thompson Station, in the county of Carroll and State of Illinois, have invented a new and useful Compound for Destroying Lice on Trees; and I do hereby declare that the following is a full and exact description thereof.

The object of my invention is to provide a suitable compound for destroying lice infesting trees.

It is well known by nurserymen and others having charge of trees that the bark of the same frequently becomes rough and knotty, in consequence of which the small trees become nearly worthless, and the larger ones nearly cease to bear fruit, and the quality produced is much inferior to that borne by healthy trees; and, further, that a small insect known as the "tree-louse" incases himself in the bark of the tree under a crust or cap, and there cuts off the natural supply of sap which would otherwise nourish the tree and keep it in a healthy condition.

I am well acquainted with the various solutions now used for washing the bark of trees in order to destroy this pest of the orchard and park; but none have proved effectual, because it has required a stronger solution to destroy the caps which cover the louse than the common bark of the tree. Hence more injury has been produced by the use of such remedies than good accomplished.

I claim to have discovered that the tree must be more or less diseased before the louse will attack it, and that this disease is caused in a great measure from the want of certain ingredients in the soil, which may be supplied with carbon and vitriol.

By the use of my invention I claim that this deficiency can be supplied so as to invigorate the sap of the tree and destroy the lice in all instances where the tree is not too far gone.

The ingredients used are, first, charcoal, second, blue vitriol.

The compound is made of about equal parts of each.

The method of applying my compound to the tree is as follows: I first dig the earth away from the main trunk of the tree with a hoe or any other suitable instrument. I then, by means of an auger, make a small hole above the principal roots, extending into the heart of the tree. After which I fill the hole nearly full of the compound, (No. 3,) and then stop the mouth of the hole with a plug made of common wood.

It is impossible to give any definite size for making the hole, or the quantity of the compound to use in each particular case, the whole being governed by the size and condition of the tree; but care must be taken not to cut away too much wood.

The compound is gradually carried up by means of the sap, and diffused through the branches of the tree, and the chemical change produced by the compound will destroy the lice; and in about four weeks after the operation the branches mostly destroyed by the lice will die, and in about eight months the other portion of the tree will resume its usual green appearance. The caps will remain on the tree for some two or three years, but will gradually pass away and leave the bark in good condition.

The compound can be applied at any time of the year when the sap is flowing.

Having thus fully described my invention, what I claim as new, and desire to secure by Letters Patent of the United States, is—

The ingredients herein described, when compounded substantially and for the purpose set forth.

MICHAEL O. SULLIVAN.

Witnesses:
 WM. H. COCHRANE,
 JAMES G. HOLMAN.